Nov. 1, 1949     W. J. FREUND     2,486,833

HEAT STORAGE AND SUPPLY MEANS

Filed Nov. 17, 1944     2 Sheets-Sheet 1

INVENTOR.

WILLIAM J. FREUND

BY Lancaster, Allwine and Rommel

ATTORNEYS.

Nov. 1, 1949  W. J. FREUND  2,486,833
HEAT STORAGE AND SUPPLY MEANS
Filed Nov. 17, 1944  2 Sheets-Sheet 2

INVENTOR.
WILLIAM J. FREUND
BY
ATTORNEYS.

Patented Nov. 1, 1949

2,486,833

UNITED STATES PATENT OFFICE 2,486,833

HEAT STORAGE AND SUPPLY MEANS

William J. Freund, Miami, Fla., assignor of forty-four one-hundredths to Walter J. Kelly, Miami, Fla.

Application November 17, 1944, Serial No. 563,903

6 Claims. (Cl. 62—5)

This invention relates to improvements in storage and control equipment for heating and cooling systems.

The primary object of this invention is the provision of an improved system for controlling a heated fluid adapted to be fed to the generator of an absorption type refrigeration unit.

A further object of this invention is the provision of an improved device for controlling a supply of heated fluid received from a solar heater for controlled transmission to a device such as a generator of an absorption type of refrigeration or air conditioning unit.

Other objects and advantages of this invention will be apparent during the course of the following detailed description.

In the accompanying drawings, forming a part of this specification, and wherein similar reference characters designate corresponding parts thruout the several views, Figure 1 is a vertical cross sectional view taken thru the improved fluid control storage tank.

Figure 1:
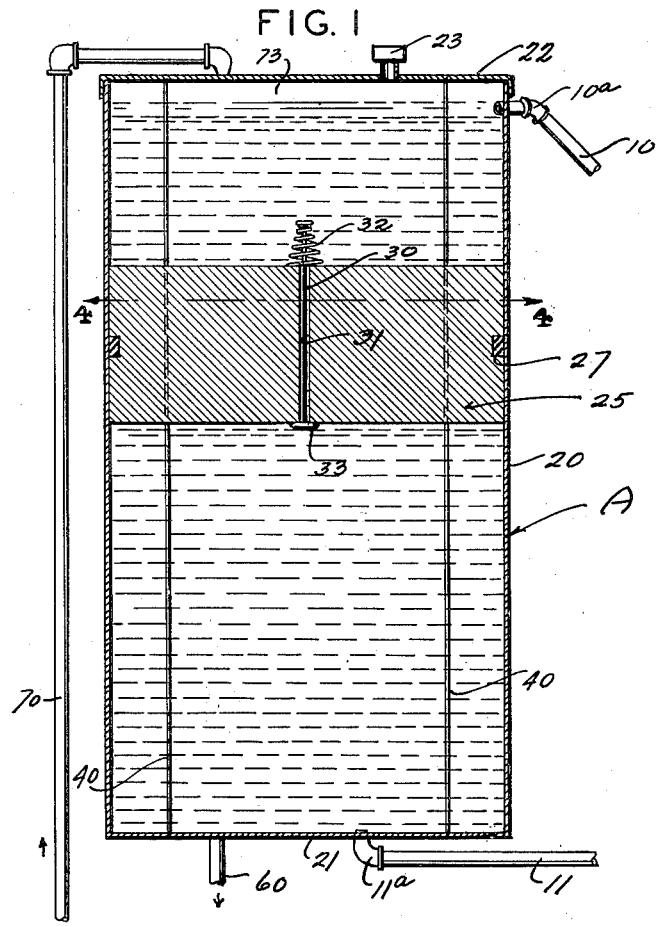

In the drawings, wherein for the purpose of illustration is shown only a preferred embodiment of the invention, the letter A may generally designate the improved storage and control tank connected in fluid circuit with a solar heater B and with the absorption equipment of a device such as a refrigerator C.

The solar heater B is of the type referred to in my co-pending application filed November 17, 1944, Serial Number 563,902, now Patent No. 2,467,885, and includes a supply inlet line 10 leading thereto and an outlet line 11 leading therefrom. The lines 10 and 11 preferably have pressure regulating valves 12 and 13 respectively therein adjacent to the heater.

The purpose of the supply and control tank A is that of receiving the heated fluid from the solar heater B and transmitting it to a device C which may be an air conditioner, refrigerator or the like, having a generator; the fluid being returned therefrom to the tank A and from the tank A to the solar heater B thru the line 10.

The tank A preferably consists of a cylindrical-shaped body 20 of any approved material. The tank 20 will, of course, preferably be insulated since it is adapted to receive a supply of hot water. No designation of this insulation has been made in the drawings since it is entirely a matter of preference as to the manner in which the insulation may be accomplished, and indeed if found desirable, it may be omitted entirely. The tank A furthermore includes a bottom wall 21 and a removable top closure 22 having a vent 23 therein which may be a valve adapted to open upon the increase of pressure to a predetermined extent.

Reciprocably mounted within the tank is a piston 25 having a sliding fit therein which will admit its rise and fall in the tank, as will be subsequently mentioned. To prevent leakage past the piston 25 of the hot fluid below the piston into the area above the piston adapted to receive the cooler fluid, I may provide a piston ring 27 of any approved nature just contacting the walls of the tank sufficient to prevent leakage of fluid past the piston and yet permit sliding of the piston within the contemplation of the invention, as will hereinafter appear.

The piston 25 has appreciable weight and is adapted to operate upon the body of liquid below the piston for the purpose of force feeding it under circumstances to be hereinafter related.

Figure 2:
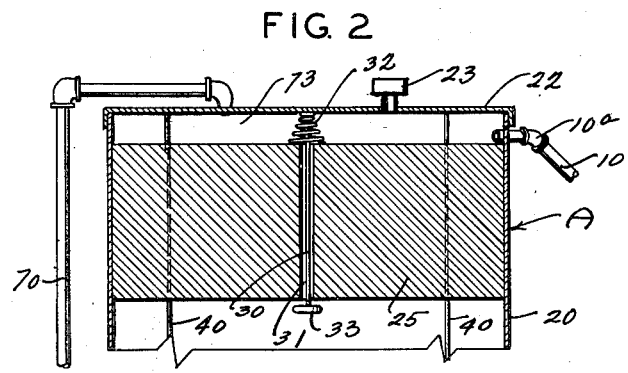
Figure 2 is a fragmentary view showing the operation of a relief valve associated with the storage tank.
Figure 3:
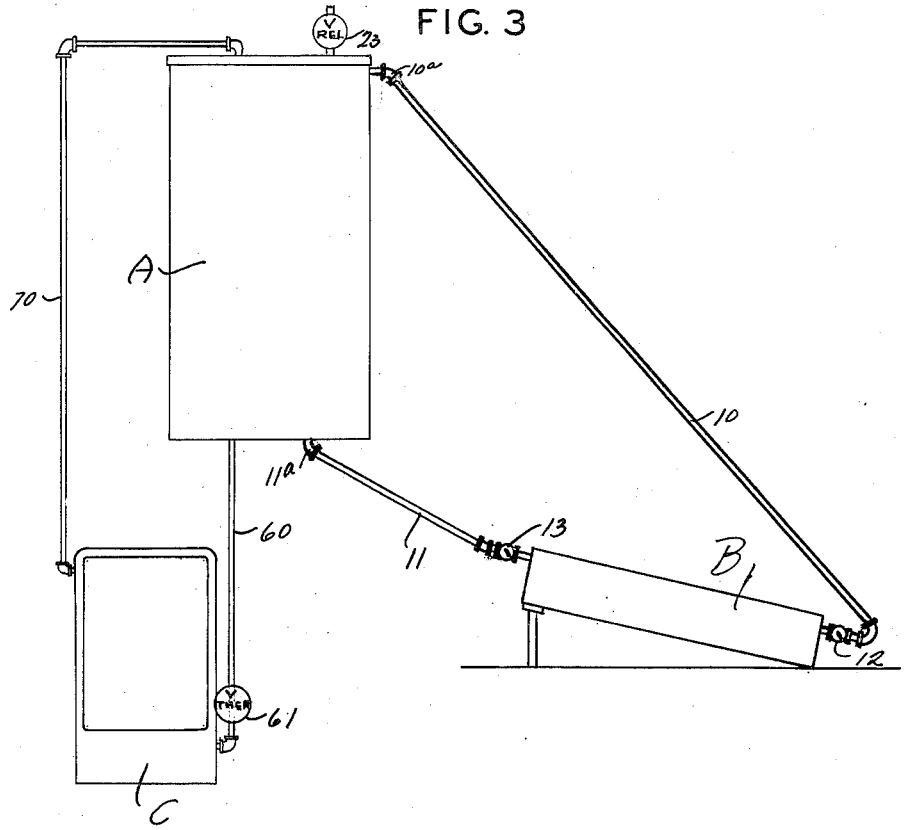
Figure 3 is a diagrammatic view showing the arrangement of the storage tank in a fluid circuit including a solar heater and a refrigerator.

Centrally of the piston there is provided a relief valve adapted to open under a heavy load of hot liquid or pressure existing in the tank below the piston so that such pressure may escape thru the vent 23. This valve consists of a stem 30 reciprocably mounted within a passageway 31 of the piston. A coil spring 32 on top of the piston normally urges the valve head 33 below the piston into sealing relation with the passageway 31. The upper end of the stem 30 extends above the top of the piston sufficient to engage the closure 22 as the piston rises to the extent shown in Figure 2 for the purpose of relieving the pressure in the tank below the piston in the manner above mentioned.

Figure 4:
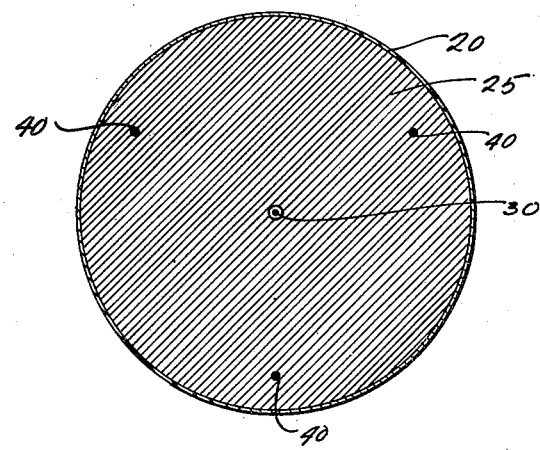
Figure 4 is a transverse cross sectional view taken substantially on the line 4—4 of Figure 1.

The piston 25 may be guided upon certain control and supporting wires 40 shown in Figures 1 and 4 of the drawings. They rather snugly fit in openings of the piston yet permit free sliding of the piston therealong.

The tank A is provided with a hot liquid inlet connection 11ª leading from the line 11 into the bottom of the tank below the piston. It furthermore includes a cold fluid return line connection 10ª leading from the top of the tank above the piston, at a point slightly below the inside surface of the cover 22; the connection 10ª forming part of the line 10 for return of the fluid to the heater.

It is to be noted that the tank A below the piston receives the expanding hot liquid or fluid from the solar heater B and therefrom the liquid is fed thru an outlet line 60 to the generator (not shown) of a refrigerator or other unit C adapted to be operated by the hot liquid. This line 60 may have a thermostatically controlled valve 61 therein regulated by desired temperatures. The tank A is provided with a return line 70 connecting in the closure 22 above the expansion space 73. The line 70 connects with the refrigeration unit C and is adapted to control return of the fluid to the space in the supply tank A above the piston 25.

So far as the broad principle of the supply and control tank is concerned, the same may be adapted to control the reception and transmission of any fluid, but it is chiefly useful in the system herein outlined in association with a solar heater and some unit desired to be operated by means of the hot liquid generated in the solar heater. The hot liquid from the control tank may operate absorption units of equipment such as set forth in my co-pending applications, Serial Number 563,905, filed November 17, 1944, and Serial Number 563,904, filed November 17, 1944, now abandoned.

Referring to the principle of operation, the fluid used in the system is preferably non-inflammable and freely flowing. It preferably has a boiling point in the vicinity of 340° F. and a freezing point of —60° F. To that end such compounds will be used as follows:

(a) Ethylene glycol $HOCH_2CH_2OH$
(b) Diethylene glycol, $CH_2OHCH_2OCH_2CH_2OH$ Referring to a cycle of operation, the solar heater of course heats the fluid and under expansion pressure generated therein the fluid escapes past the pressure regulating valve 13 into the line 11 and enters the lower compartment of the tank below the piston 25. Incident to rise of the liquid in the tank due to expansion of the liquid and the pressure therein, the piston rises according to the supply of liquid furnished the tank A by the solar heater. The supply of hot liquid from the solar heater passes thru the line 60 and thru the thermostatic valve according to the supply of liquid called for and enters the generator of an absorption unit (not shown) of the refrigerating device C. The expended fluid travels therefrom thru the line 70 and is deposited in the top of the tank above the piston 25.

It should be noted in connection with operation of the tank A that the piston 25 is of a weight sufficient to create the necessary pressure upon the liquid for force feeding thereof thru the generator of the absorption unit at such times as the solar heater is not generating fluid. In other words, the tank A is intended to be of sufficient size to contain a quantity of hot liquid or fluid necessary for the operation of the refrigerating unit C over a desired period of time, so that it is not necessary for the solar heater to be continuously generating heated fluid.

It is noted that the return line connection 10a is placed in the tank below the top wall of the tank so as to create an air or expansion space 73 since the fluid under varying conditions may expand. The fluid from the space above the piston of course escapes thru the line 10 to the solar heater B where it is again heated and sent to the line 11 for return to the tank below the piston.

Various changes in the shape, size and arrangement of parts may be made to the form of invention herein shown and described, without departing from the spirit of the invention or the scope of the following claims.

I claim:

1. In equipment for controlling a liquid supply, the combination of a receptacle having a chamber therein, a reciprocating piston dividing the chamber into compartments at each side thereof, means connecting with the receptacle in each of said compartments for the inlet and outlet of fluids with respect thereto, valve means carried by the piston for regulating the relief of the liquid from one compartment to the other compartment, and vent means for pressure relief from one compartment.

2. In a fluid control system the combination of a receptacle, piston means in the receptacle dividing the same into at least a first compartment and a second compartment, heater means for heating a fluid, means for directing the heated fluid from the heater means to the first compartment, means connecting the heater means with the second compartment for return of the fluid to the heater means from the second compartment, a unit adapted to receive the heated liquid from the compartment of said tank which receives the heated liquid from the heating means, means for so directing the heated liquid from said first compartment to said unit, and means connecting said unit with the second compartment of the receptacle for return of the fluid from said second unit to said compartment of the receptacle.

3. In a fluid control system the combination of a receptacle, piston means in the receptacle dividing the same into at least a first compartment and a second compartment, heater means for heating a fluid, means for directing the heated fluid from the heater means to the first compartment, means connecting the heater means with the second compartment for return of the fluid to the heater means from the second compartment, a unit adapted to receive the heated liquid from the compartment of said tank which receives the heated liquid from the heating means, means for so directing the heated liquid from said first compartment to said unit, means connecting said unit with the second compartment of the receptacle for return of the fluid from said unit to said second compartment of the receptacle, and a pressure relief valve carried by said piston for relief flow of the hot fluid from the hot fluid receiving compartment of the receptacle into the second compartment upon the building up of exceptional pressures within said tank.

4. In a fluid control system the combination of a receptacle, piston means in the receptacle dividing the same into at least a first compartment and a second compartment, heater means for heating a fluid, means for directing the heated fluid from the heater means to the first compartment, means connecting the heater means with the second compartment for return of the fluid to the heater means from the second compartment, a unit adapted to receive the heated liquid from the compartment of said tank which receives the heated liquid from the heating means, means for so directing the heated liquid from said first compartment to said unit, means connecting said unit with the second compartment of the receptacle for return of the fluid from said second unit to said compartment of the receptacle, a pressure relief valve carried by said piston for relief flow of the hot fluid from the hot fluid receiving compartment of the receptacle into the second compartment upon the building up of exceptional pressures within said tank, and other means operatively connected with said tank for pressure venting from said receptacle.

5. In a fluid supply and control system of the class described, the combination of a supply and control tank, a vertically reciprocable piston in said tank dividing the same into an upper compartment and a lower compartment, a fluid heating device, means for directing heated fluid from said device to the lower compartment of the tank, means for directing the flow of fluid from the upper compartment of the tank to said heating means, liquid outlet and liquid inlet lines connected respectively with the lower and upper compartments of said tank, and an absorption type refrigeration unit connected with said last mentioned line.

6. In a fluid supply and control system of the class described, the combination of a supply and control tank, a vertically reciprocable piston in said tank dividing the same into an upper compartment and a lower compartment, a fluid heating device, means for directing heated fluid from said device to the lower compartment of the tank, means for directing the flow of fluid from the upper compartment of the tank to said heating means, liquid outlet and liquid inlet lines connected respectively with the lower and upper compartments of said tank, an absorption type refrigeration unit connected with said last mentioned line, and a pressure regulator controlling the feed of hot fluid from the heating means to said lower tank compartment.

WILLIAM J. FREUND.

REFERENCES CITED

The following references are of record in the file of this patent:

UNITED STATES PATENTS

| Number | Name | Date |
|---|---|---|
| 787,909 | Fox | Apr. 25, 1905 |
| 1,274,011 | Cummings | July 30, 1918 |
| 1,295,687 | Bullard | Feb. 25, 1919 |
| 1,372,540 | Owens | Mar. 22, 1921 |
| 2,291,033 | Goepfrich | July 28, 1942 |
| 2,297,761 | Hainsworth | Oct. 6, 1942 |